United States Patent [19]

Nguyen et al.

[11] Patent Number: 4,998,069

[45] Date of Patent: Mar. 5, 1991

[54] LOOPBACK TESTER FOR TESTING FIELD REPLACEABLE UNITS

[75] Inventors: Vien Nguyen, Fremont; Anand R. Patel, San Jose; John A. Blakkan, Santa Clara, all of Calif.

[73] Assignee: Tandem Computers Incorporated, Cupertino, Calif.

[21] Appl. No.: 331,467

[22] Filed: Mar. 31, 1989

[51] Int. Cl.⁵ .............................................. H04B 3/46
[52] U.S. Cl. .................................................. 324/539
[58] Field of Search ................ 324/539, 541, 544, 66; 371/24, 25.1

[56] References Cited

U.S. PATENT DOCUMENTS

| | | | |
|---|---|---|---|
| 4,134,099 | 1/1979 | Lankford, Jr. ...................... | 324/539 |
| 4,443,755 | 4/1984 | Wooten ................................ | 324/66 |
| 4,468,612 | 8/1984 | Starr .................................... | 324/66 |
| 4,772,845 | 9/1988 | Scott ................................... | 324/540 |

FOREIGN PATENT DOCUMENTS

564611  2/1975  U.S.S.R. ............................... 324/66

Primary Examiner—Reinhard J. Eisenzopf
Assistant Examiner—Maura K. Regan
Attorney, Agent, or Firm—Townsend and Townsend

[57] ABSTRACT

An apparatus for testing cables, cable connections associated with devices and devices in a daisy chain configuration. Cable malfunctions and cable connection malfunctions can be isolated down to a single device in a daisy chain system by looping back the data bus to the control bus or vice versa. A signal is then sent out on the first bus and received back on the second bus. If a cable malfunction is present, the signal received will not be the same as the signal transmitted.

18 Claims, 5 Drawing Sheets

LOOPBACK TESTER FOR TESTING FIELD REPLACEABLE UNITS

BACKGROUND OF THE INVENTION

The present invention relates generally to loopback testing of field replaceable units in a system with a host adapter and at least one other device connected together. More particularly, the invention is directed at testing devices in a daisy chain configuration to isolate malfunctions in such a system.

Problems in a system utilizing a cabling network are very difficult to isolate because cabling between devices and host adapters is very complex. In addition, in a daisy chain configuration, all of the devices are connected together and the numerous cables form, in essence, one cable. One method for determining the cause of a malfunction in a cabling network is to remove one device at a time. After removing a particular device, the system is tested to see if the problem has been eliminated. In some cases more than one device may be malfunctioning. This means that to determine which units are malfunctioning, each and every unit in the system may need to be removed. Using this method can be both frustrating and time consuming.

Another form of testing cables in a cable network is to examine each cable connection to make sure it is secure. In some cases if there is a loose pin inside a connector, moving or shaking the connector can make the difference between proper operation and malfunction. This technique is very unscientific and is a last resort for a user trying to locate a problem in the system. As with the previous technique, the user may become frustrated and may incur a needless waste of time.

SUMMARY OF THE INVENTION

The present invention is directed to provide testing for malfunctions in a cabling system in a time efficient and scientific manner. This invention uses a loopback testing technique on the cables which make up the cabling network. By using the cables themselves to carry out the testing, it becomes clear where the malfunction in the cabling system is located. This invention can be used in a daisy chain configuration with differential ANSI/SCSI interface or single ended SCSI (See American National Standard Institute ANSI X3.131-1986)

Another object of the invention is to provide a simple, low-cost testing device which is transparent to the cabling network when testing is not being carried out. This allows the user to implement the invention so that the cabling network can be tested without altering the physical structure of the system. In addition, the system can be used without interference from the invention while it is implemented.

A further object of the invention is to provide for testing which allows the user to test each device in the system one at a time. This technique saves time and in some cases allows the user to find more than one malfunction existing in the system at the same time.

Still another object of the invention is to provide a technique for the testing of cabling and device problems which is unaffected by the removal of a particular device from the system. In addition, in a daisy chain configuration the invention allows a particular device to be moved to a different location along the chain without affecting testing.

These features, as well as others, will become more readily apparent from the following detailed description of the preferred embodiment when taken in conjunction with the illustrative embodiment in the accompanying drawings.

DETAILED DESCRIPTION OF THE PREFERRED EMBODIMENT

In general, to those skilled in the art to which this invention relates, many changes in construction and widely differing embodiments and applications of the present invention will suggest themselves without departing from its spirit and scope. Thus the disclosures and descriptions herein are purely illustrative and are not intended to be in any sense limiting.

Figure 1:
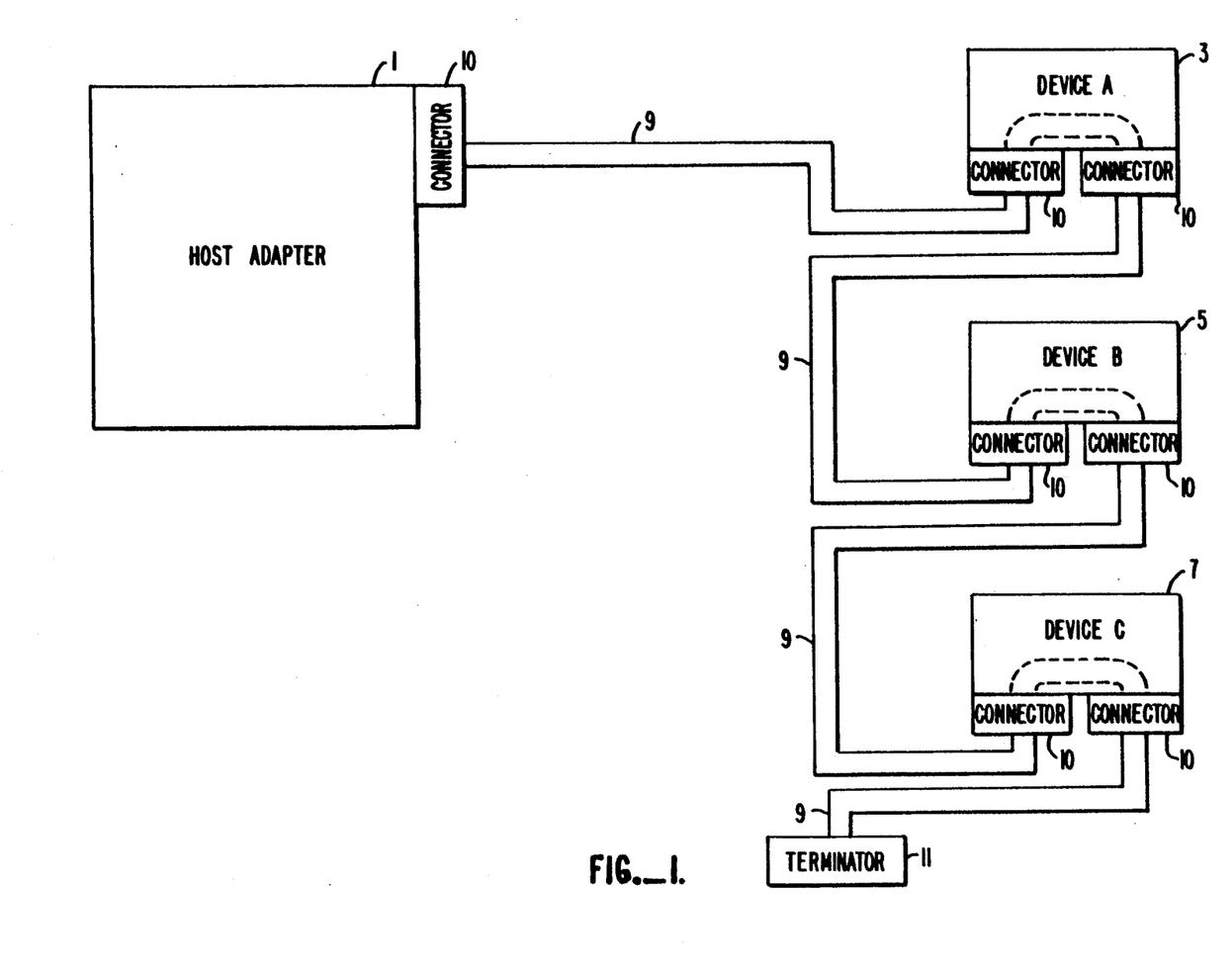
FIG. 1 is a block diagram of a system in a daisy chain configuration including a host adapter and three devices.

Turning now to the drawings. FIG. 1 is a functional block diagram of the preferred embodiment of the invention residing in a system with a daisy chain configuration and having differential ANSI/SCSI interface only (single ended SCSI is possible by using an unused pin).

A host adapter 1 is shown connected to device-A 3, device-B 5, and device-C 7 by a group of cables 9. Host adapter 1 and devices 3, 5, and 7 are arranged in a daisy chain configuration with a terminator 11 situated at the end of the cable network. Terminator 11 may be removed to add more devices to the system. Terminator 11 is not necessary to the operation of the invention. Cable 9 is coupled to host adapter 1 and each of devices 3, 5, and 7 by connectors 10.

Figure 2:
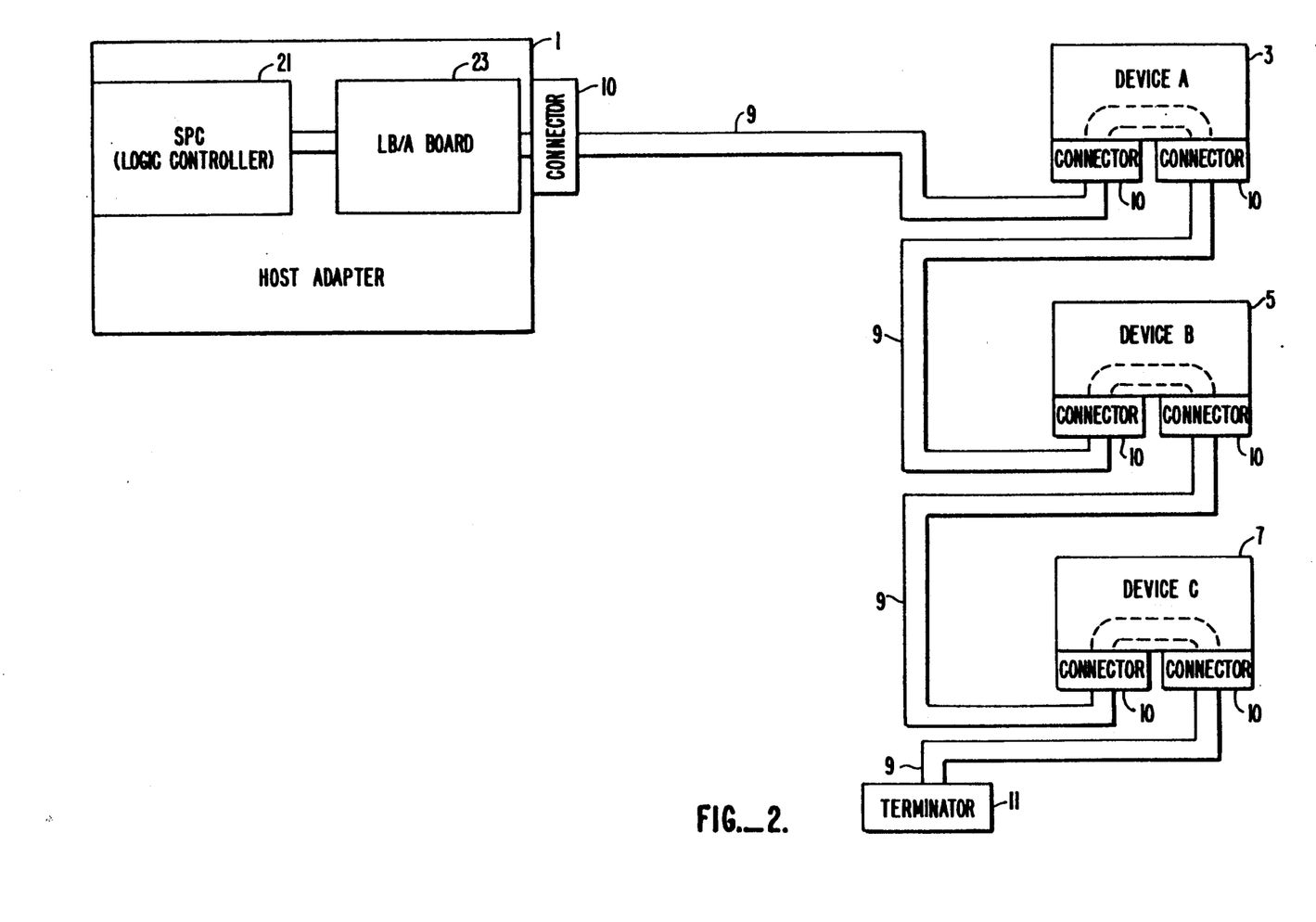
FIG. 2 is a block diagram of a system in a daisy chain configuration illustrating the components of the host adapter.

FIG. 2 shows the same system of FIG. 1 with a more detailed illustration of host adapter 1. Host adapter 1 includes a logic controller 21 and a loopback/adapter (LB/A) board 23. Logic controller 21 may typically be a SCSI protocol controller. Logic controller 21 is responsible for issuing control signals, providing data signals, and receiving data signals while testing is being conducted on the various devices. LB/A board 23 provides the necessary hardware for the loopback testing to be carried out.

Figure 3:
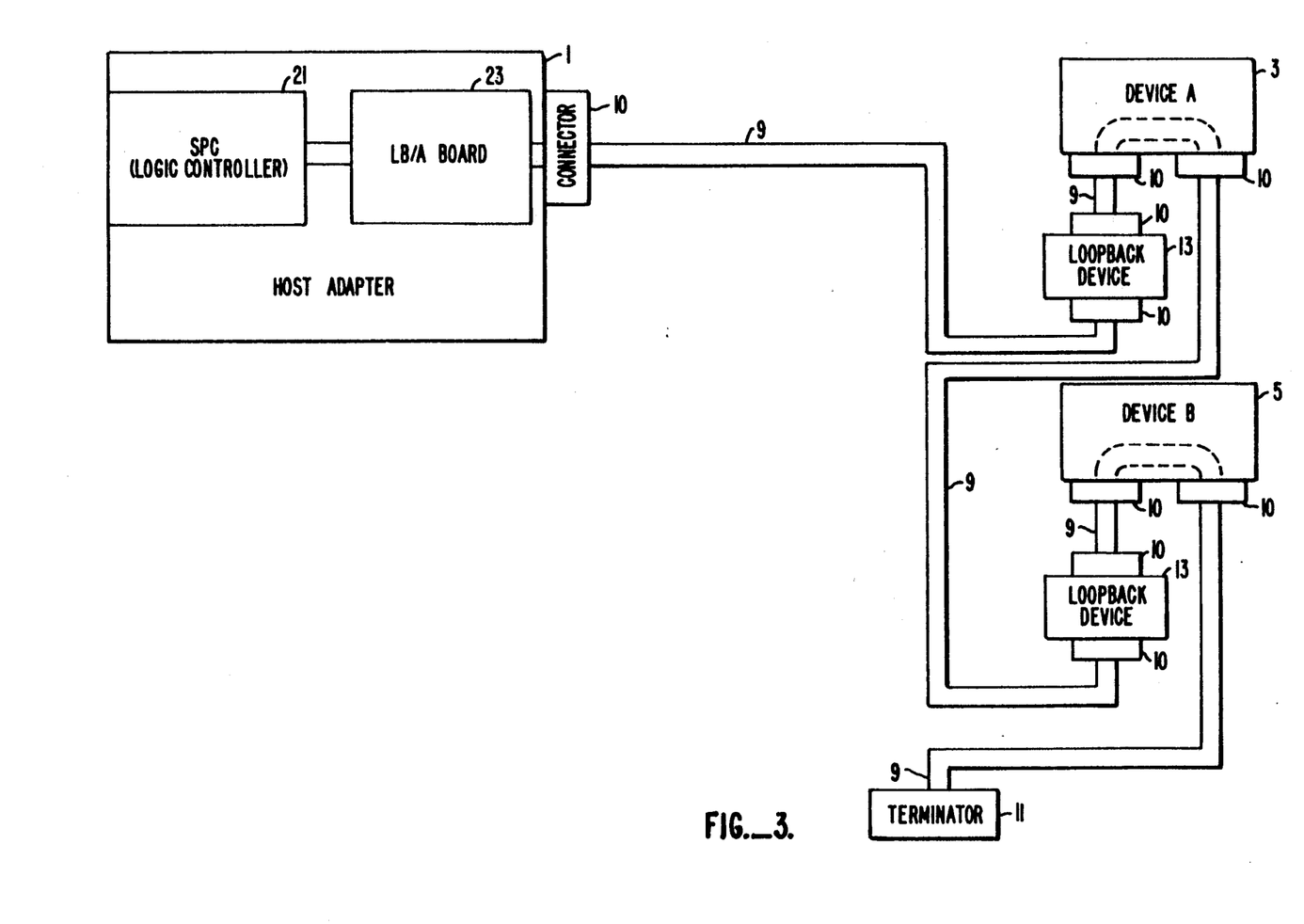
FIG. 3 is a block diagram of an alternative system in a daisy chain configuration with a separate loopback device situated outside and directly preceding the separate devices.

FIG. 3 shows an alternative embodiment of the invention illustrated in FIG. 2. In this embodiment, a loopback device 13 which is contained within each of devices 3, 5, and 7 in FIG. 2, is shown outside each of devices 3, 5, and 7 in the form of a separate device. A separate loopback device 13 can be used for each device unless only one loopback device 13 is available. In that case, loopback device 13 can be moved to a position directly preceding a device to be tested. Testing is carried out and then loopback device 13 is moved to the next device. By moving loopback device 13 to a position directly preceding each of devices 3, 5, and 7, each device can be tested without each device needing its own separate loopback device 13. The testing of the devices is described below.

Figure 4:
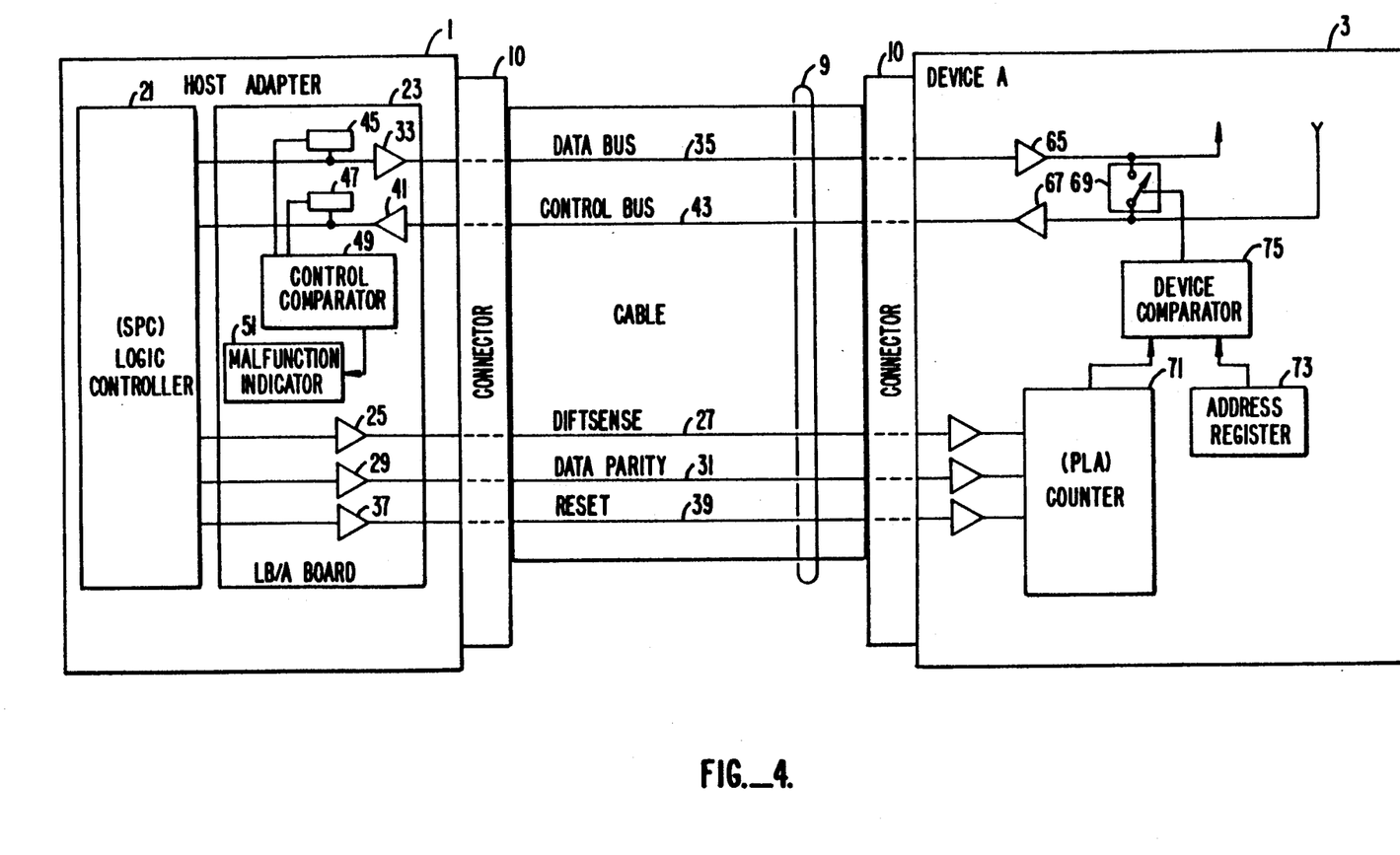
FIG. 4 is a functional schematic of the system of the invention illustrating the circuitry of the host adapter and a single device.

FIG. 4 shows a schematic of the circuitry included in host adapter 1 and device-A 3 for conducting testing in the daisy chain configuration. FIG. 4 is a detailed illustration of FIG. 2 including host adapter 1 and one device (device-A 3). FIG. 4 is also a detailed illustration of FIG. 3. In the embodiment of FIG. 3, the components shown within device-A are located in loopback device 13 directly preceding the devices 3, 5, and 7.

Logic controller 21 is shown connected to LB/A board 23. LB/A board 23 contains a number of receivers and transmitters. A first transmitter 25 is connected to a diffsense line 27: a second transmitter 29 is connected to a data parity line 31; a third transmitter 33 is connected to a data bus 35; a fourth transmitter 37 is connected to a reset line 39. A first receiver 41 is connected to a control bus 43. In the invention, data bus 35 and control bus 43 may be interchanged since one is used to transmit and the other to receive the same signal. In other words, the two busses are merely looped back on one another. In a typical system, all of the above-mentioned lines are provided in one cable 9 which may be a standard SCSI line. These cables 9 are coupled to the devices by connectors 10 at the ends of cables 9.

LB/A board 23 also includes a transmit register 45 and a receiver register 47 each of which is used to store a signal. Transmit register 45 is connected to third transmitter 33 and stores a copy of the signal transmitted on data bus 35. Receiver register 47 is connected to first receiver 41 and stores a copy of the signal received on control bus 43. A control comparator 49 is connected to transmit register 45 and receiver register 47. Control comparator 49 is also connected to logic controller 21 and to indicator means 51.

Logic controller 21 is connected to LB/A board 23 for transmitting signals to and receiving signals from LB/A board 23. More particularly, logic controller 21 is connected to first transmitter 25, second transmitter 29, third transmitter 33, fourth transmitter 37, and first receiver 41. A typical logic controller used in this device is the Fujitsu MB88730 chip.

Device-A 3 includes a device receiver 65 and a device transmitter 67. Device receiver 65 and device transmitter 67 are typically part of device-A 3 even without implementation of the invention. Device receiver 65 and device transmitter 67 are connected by a switch 69. When switch 69 is open, device-A 3 works as it would in normal operation of the system. When switch 69 is closed, device-A 3 is in testing mode.

A counter 71 is connected to diffsense line 27 for receiving a diffsense signal. Counter 71 is also connected to data parity line 31 and reset line 39. Counter 71 receives a set of identification pulses on data parity line 31 and is reset when a reset signal is received on reset line 39.

Each device including device-A 3 includes an address register 73. Address register 73 stores a SCSI identification number for the particular device in which it resides. Address register 73 is connected to a device comparator 75. Device comparator 75 is also connected to counter 71. Device comparator 75 compares the SCSI identification number stored in address register 73 with the number of identification pulses received by counter 71. When the two values are equal, device comparator 75 issues a switch control signal causing switch 69 to close. This puts device-A 3 in the testing mode.

Figure 5:
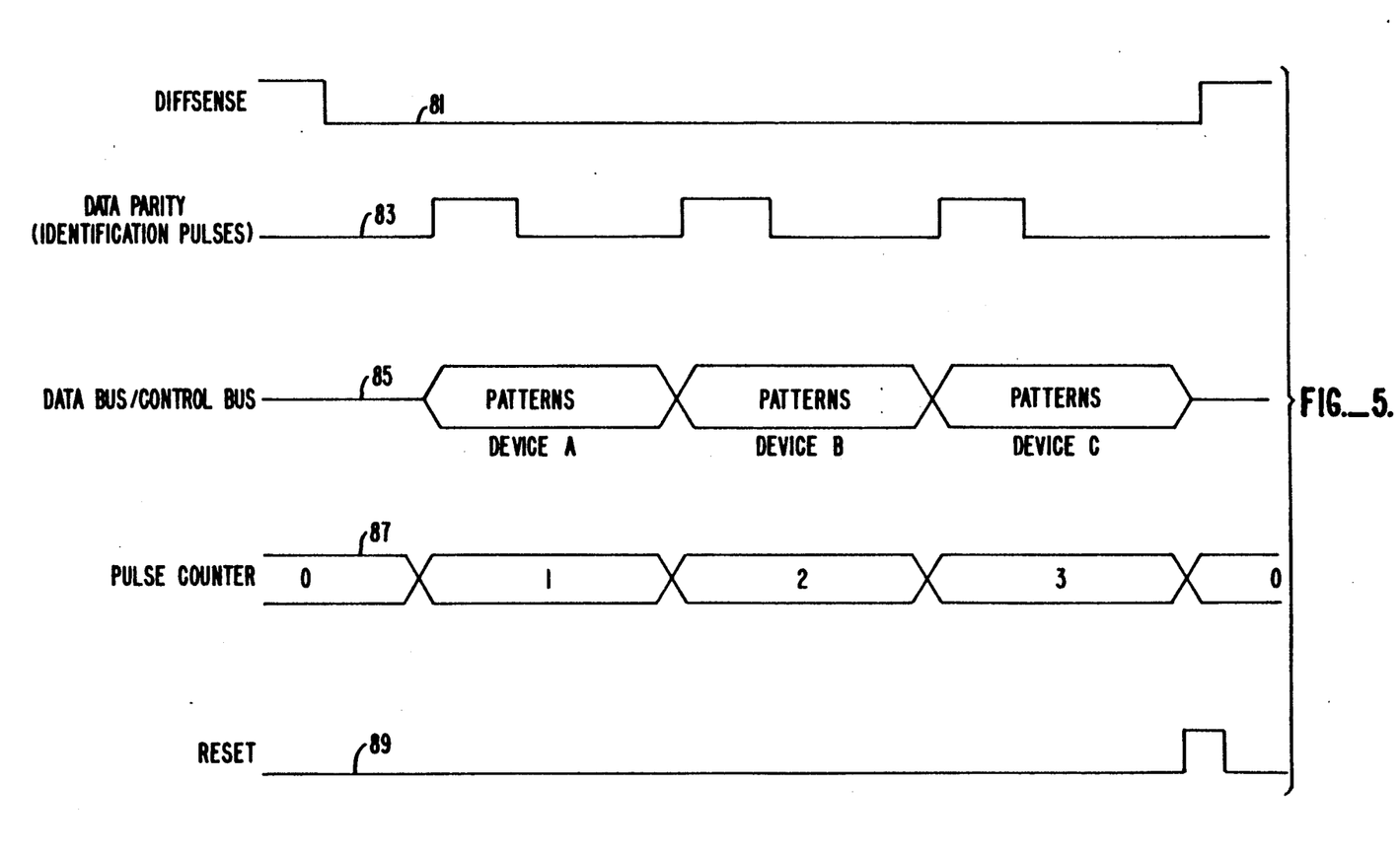
FIG. 5 is a timing diagram showing the timing of the various signals present in the invention during testing.

FIG. 5 is a timing diagram showing the various signals as they occur during operation of the invention. The first signal shown is the diffsense signal 81 transmitted on diffsense line 27. The second signal is the set of identification pulses 83 transmitted on data parity line 31. The third signal is the first data signal 85 as it is transmitted from host adapter 1 to device-A 3 on data bus 35 and looped back from device-A 3 to host adapter 1 on control bus 43. The fourth signal is the pulse counter signal 87 showing the intervals each of which represents the testing of a different device. The fifth signal is a reset signal 89 transmitted on reset line 39 to reset the counter 71 of each device.

The operation of the invention will now be explained with reference to FIGS. 4 and 5. For the invention to work, it is assumed that the host adapter is functioning properly. When testing is required, logic controller 21 issues a diffsense signal to LB/A board 23. This signal passes through first transmitter 25 and is output to device-A 3 on diffsense line 27. The diffsense signal 81 is received by device-A 3 at counter 71. This signal disables device-A 3 and all other devices in the system so that other system signals are not transmitted thereby causing erroneous test results.

Once the devices are disabled, host adapter 1 may begin testing the devices for malfunctions. After disabling the system, host adapter 1 must identify a particular device for testing. This is done by sending a number of identification pulses on data parity line 31.

Logic controller 21 transmits the identification pulses to LB/A board 23 where it is output by second transmitter 29 on data parity line 31. The identification pulses are received by counter 71 located in each device. Counter 71 counts the pulses as they are received. When all the pulses have been received, device comparator 75 compares the number of identification pulses to the predetermined device identification number stored in address register 73. If the numbers are the same, device comparator 75 issues a switch control signal to switch 69 closing switch 69. When switch 69 is closed, data bus 35 is looped back on control bus 43.

Device-A 3 is now ready to be tested. A first data signal is transmitted by logic controller 21 to LB/A board 23. The first data signal is received by LB/A board 23 and transmitted to device-A 3 by third transmitter 33 on data bus 35. Before the first data signal is output a copy of the signal is stored in transmit register 45. The first data signal is received by device receiver 65 and looped back through switch 69.

Transmission of the first data signal is carried out by device transmitter 67 on control bus 43. From there, the first data signal is referred to as second data signal. This second data signal is received by first receiver 41 in LB/A board 23. A copy of the signal is stored in receiver register 47. Once the second data signal is passed from the LB/A board 23 to logic controller 21, logic controller 21 issues a control signal to control comparator 49. This causes control comparator 49 to compare the first data signal stored in transmit register 45 to the second data signal stored in receiver register 47. Control comparator 49 then issues a signal to malfunction indicator 51 which indicates to a user whether the tested cables 9 and cable connectors 10 are malfunctioning.

If the second data signal equals the first data signal then cables 9 and cable connectors 10 associated with the tested device as well as the tested device are not malfunctioning. If the second data signal is not equal to the first data signal, then depending upon the second signal received, either cables 9 or cable connectors 10 associated with the tested device or the test device itself is malfunctioning.

After making the comparison, control comparator 49 issues a malfunction signal to the malfunction indicator 51, which in turn, indicates whether or not the particular device being tested in this case device-A 3, has a cable malfunction. Once the signal is sent to logic controller 21, the test results can be accessed by the user. If the test results show that cable 9 or cable connector 10 is malfunctioning, the user can adjust cable connector 10 or replace cable 9.

Logic controller 21 then issues a reset signal to LB/A board 23. This reset signal is received by fourth transmitter 37 and transmitted to counter 71 of each device, including device-A 3, via reset line 39. The system is then ready to test the next device.

What is claimed is:

1. A cable testing apparatus for isolating malfunctions in a cabling network configured in a daisy chain, including a host adapter, a plurality of devices, and a plurality of cables, each cable having a first end and a second end wherein, the plurality of devices are tested one at a time, starting with the device nearest to the host adapter and proceeding, in order, to the device furthest away from the host adapter, the apparatus capable of isolating a malfunction down to one of either an input cable associated with a selected test device and any connection associated with the input cable, the input cable connected such that the first end is connected to the selected test device and the second end is connected to one of either the host adapter and a device directly preceding the selected test device in the daisy chain, comprising:

a first bus included in each of the plurality of cables;
a second bus included in each of the plurality of cables;
means for looping back a first data signal received on said first bus to said second bus wherein, after looping back said first data signal to said second bus, said first data signal is referred to as a second signal;
driving means included in the host adapter for transmitting said first data signal to said means for looping back of the selected test device on said first bus and for receiving said second data signal from said means for looping back of the selected test device on said second bus; and
comparing means included in the host adapter and connected to said driving means for comparing said first data signal to said second data signal after said second data signal is received by said driving means wherein, if said second data signal is equal to said first data signal then a malfunction does not exist with respect to the input cable of the selected test device and if said second data signal is not equal to said first data signal then a malfunction does exist with respect to the input cable of the selected test device.

2. The apparatus of claim 1 wherein, the host adapter further includes:

a logic controller for controlling operation of the apparatus; and a loopback/adapter (LB/A) board connected between said logic controller and the plurality of devices, including:
a first transmitter for transmitting a disable signal, received from said logic controller, to the plurality of devices so that each one of the plurality of devices will disable itself for testing purposes,
a second transmitter for transmitting said number of identification pulses, received from said logic controller, to the plurality of devices, and
a third transmitter for transmitting a reset signal, received from said logic controller, to the plurality of devices so that each of the plurality of devices can be reset.

3. The apparatus of claim 1 wherein said means for looping back further comprises:
a device receiver for receiving signals on said first bus;
a device transmitter for transmitting signals on said second bus;
a switch, responsive to a switch control signal, having a first end connected to said device receiver and a second end connected to said device transmitter;
a counter for counting a number of identification pulses input to said counter and outputting a count signal indicating the number of pulses counted;
an address register for holding a predetermined device identification number; and
a device comparator connected to said switch, said counter, and said address register for receiving said count signal and issuing said switch control signal when said number of identification pulses is equal to said predetermined devices identification number causing said switch to close such that said device receiver is connected to said device transmitter.

4. The apparatus of claim 3 wherein, said device receiver, said device transmitter, said switch, said counter, said address register, and said device comparator comprise a separate device connected in series with the selected test device.

5. The apparatus of claim 3 wherein, said device receiver, said device transmitter, said switch, said counter, said address register, and said device comparator are contained within and comprise a section of the selected test device.

6. The apparatus of claim 1 further comprising:
means for indicating whether a malfunction exists with respect to the input cable of the selected test device responsive to said comparing means and included in the host adapter.

7. The apparatus of claim 1 wherein said driving means further comprises:
further wherein, said driving means comprises:
a fourth transmitter for transmitting said first data signal, received from said logic controller, to said selected test device;
a first receiver for receiving said second data signal from the selected test device on said second bus and transmitting said second data signal to said logic controller;
a transmit register connected to said fourth transmitter for storing said first data signal before it is transmitted to the selected test device; and
a receiver register connected to said first receiver for storing said second data signal received by said first receiver from the selected test device.

8. A cable testing apparatus for isolating malfunctions in a cabling network configured in a daisy chain including a host adapter, a plurality of devices, and a plurality of cables, wherein, the plurality of devices are tested one at a time such that a malfunction is isolated down to one of either a cable located between a selected test device and the host adapter and a cable located between the selected test device and a last device in the daisy chain, comprising:

a first bus included in each of the plurality of cables;

a second bus included in each of the plurality of cables;

means responsive to a loopback signal on said first bus for receiving a first data signal on said first bus and transmitting said first data signal back out on said second bus, said means responsive to a loopback signal included in each of the plurality of devices wherein, after looping back said first data signal on said second bus, said first data signal is referred to as a second data signal;

driving means included in the host adapter for transmitting said first data signal to said means responsive to a loopback signal of the selected test device on said first bus and for receiving said second data signal from said means responsive to a loopback signal of the selected test device on said second bus; and comparing means included in the host adapter and connected to said driving means for comparing said first data signal to said second data signal after said second data signal is received by said driving means wherein, if said second data signal is equal to said first data signal then a malfunction does not exist with respect to a cable located between a selected test device and the host adapter and if said second data signal is not equal to said first data signal then a malfunction does exist with respect to a cable located between the selected test device and a last device in the daisy chain.

9. The apparatus of claim 8 wherein, the host adapter comprises:

a logic controller for controlling operation of the apparatus; and a loopback/adapter (LB/A) board connected between said logic controller and the plurality of devices, including:

a first transmitter for transmitting a disable signal, received from said logic controller, to the plurality of devices so that each one of the plurality of devices will disable itself for testing purposes, a second transmitter for transmitting said number of identification pulses, received from said logic controller, to the plurality of devices, and a third transmitter for transmitting a reset signal, received from said logic controller, to the plurality of devices so that each of the plurality of devices can be reset.

10. The apparatus of claim 8 wherein said means for looping back further comprises:

a device receiver for receiving signals on said first bus;

a device transmitter for transmitting signals on said second bus;

a switch, responsive to a switch control signal, having a first end connected to said device receiver and a second end connected to said device transmitter;

a counter for counting a number of identification pulses input to said counter and outputting a count signal indicating the number of pulses counted;

an address register for holding a predetermined device identification number; and a device comparator connected to said switch, said counter, and said address register for receiving said count signal and issuing said switch control signal when said number of identification pulses is equal to said predetermined device identification number causing said switch to close such that said device receiver is connected to said device transmitter.

11. The apparatus of claim 10 wherein, said device receiver, said device transmitter, said switch, said counter, said address register, and said device comparator comprise a separate device connected in series with the selected test device.

12. The apparatus of claim 10 wherein, said device receiver, said device transmitter, said switch, said counter, said address register, and said device comparator are contained within and comprise a section of the selected test device.

13. The apparatus of claim 8 further comprising means for indicating whether a malfunction exists with respect to the input cable of the selected test device responsive to said comparing means and included in the host adapter.

14. The apparatus of claim 8 wherein said driving means further comprises:

a fourth transmitter for transmitter for transmitting said first data signal, received from said logic controller, to said selected test device;

a first receiver for receiving said second data signal from the selected test device on said second bus and transmitting said second data signal to said logic controller;

a transmit register connected to said fourth transmitter for storing said first data signal before it is transmitted to the selected test device; and a receiver register connected to said first receiver for storing said second data signal received by said first receiver from the selected test device.

15. In a cabling network, wherein a plurality of devices, including a host adapter, each having an input cable, are linked together by the input cables in a daisy chain configuration, a method for isolating and identifying a malfunction consisting of one of either a cable malfunction and a connection malfunction with respect to the input cable by having the host adapter initially disable the system and then perform, upon each of the plurality of devices, in the order in which they appear in the daisy chain starting with a device closest to the host adapter and continuing to a device furthest from the host adapter, the following steps, comprising:

selecting a test device from the plurality of devices to perform testing upon;

transmitting a set of identification pulses identifying said test device selected from the plurality of devices;

readying said test device for testing by causing it to connect its receiver to its transmitter upon receipt of said set of identification pulses;

transmitting a first data signal to said test device via a first bus running within the input cable connected to said test device and running within each input cable of devices located between the host adapter and said test device;

receiving a second data signal from said test device via a second bus running within the input cable connected to said test device and running within each input cable of devices located between the host adapter and said test device;

comparing said first data signal to said second data signal to determine whether said second data signal is the same as said first data signal wherein, if they are the same then there is no malfunction associated with the input cable of said test device and if they are not the same then a malfunction exists with respect to the input cable of said test device;

indicating whether a malfunction exists with respect to the input cable of said test device.

16. The method of claim 15, further including the following steps, comprising:

resetting the plurality of devices by causing a counter in each device to be reset; and repeating the above defined steps for each device in the daisy chain configuration.

17. In a cabling network wherein, a host adapter, a plurality of devices, and a plurality of cables, each of the plurality of devices having an input cable are linked together by the input cables in a daisy chain configuration, a method for isolating and identifying a malfunction, consisting of one of either a cable malfunction and a connection malfunction with respect to the input cables, by having the host adapter initially disable the cabling network and then perform testing upon the plurality of devices such that if the malfunction is determined to exist upon testing a test device, the malfunction exists in a cable located between the host adapter and the test device and if a malfunction is determined not to exist upon testing a test device, the malfunction exists in a cable located between the test device and the end of the daisy chain, the testing steps comprising:

selecting the test device from the plurality of devices to perform testing upon;

transmitting a set of identification pulses identifying the test device selected from the plurality of devices;

readying the test device for testing by causing it to connect its receiver to its transmitter upon receipt of said set of identification pulses;

transmitting a first data signal to the test device via a first bus running within the input cable connected to the test device and running within each input cable of devices located between the host adapter and the test device;

receiving a second data signal from the test device via a second bus running within the input cable connected to the test device and running within each input cable of devices located between the host adapter and said test device;

comparing said first data signal to said second data signal wherein, if they are the same then the malfunction is located in one of the input cables positioned between the test device and the end of the daisy chain and if they are not the same then the malfunction exists with respect to one of the input cables located between the host adapter and the test device; and indicating whether a malfunction exists with respect to the input cable of said test device.

18. The method of claim 17 further including the following steps, comprising:

resetting the plurality of devices by causing a counter in each device to be reset; and repeating the above defined steps for one of either a device between the host adapter and the test device if the malfunction exists in one of the input cables positioned between the test device and the end of the daisy chain, and a device between the test device and the end of the daisy chain if the malfunction is located in one of the input cables positioned between the test device and the end of the daisy chain.

* * * * *